US007415620B2

(12) United States Patent
England et al.

(10) Patent No.: US 7,415,620 B2
(45) Date of Patent: Aug. 19, 2008

(54) SYSTEM AND METHOD FOR AUTHENTICATING AN OPERATING SYSTEM TO A CENTRAL PROCESSING UNIT, PROVIDING THE CPU/OS WITH SECURE STORAGE, AND AUTHENTICATING THE CPU/OS TO A THIRD PARTY

(75) Inventors: Paul England, Bellevue, WA (US); John D. DeTreville, Seattle, WA (US); Butler W. Lampson, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/615,361

(22) Filed: Dec. 22, 2006

(65) Prior Publication Data

US 2007/0118769 A1 May 24, 2007

Related U.S. Application Data

(63) Continuation of application No. 09/266,207, filed on Mar. 10, 1999, now Pat. No. 7,174,457.
(60) Provisional application No. 60/105,891, filed on Oct. 26, 1998.

(51) Int. Cl.
*G06F 11/30* (2006.01)
(52) U.S. Cl. ........................ 713/193; 713/164; 713/165; 713/166; 713/167; 713/168; 713/189; 726/2; 726/10; 726/18; 726/26; 726/27
(58) Field of Classification Search ......... 713/164–168, 713/173, 189, 193; 726/2, 10, 18, 26, 27
See application file for complete search history.

(56) References Cited

U.S. PATENT DOCUMENTS 4,817,140 A    3/1989   Chandra et al.
4,827,508 A    5/1989   Shear (Continued)

FOREIGN PATENT DOCUMENTS

EP     0695985     2/1996

(Continued)

OTHER PUBLICATIONS

Coffey et al, Non-repudiation with mandatory proof of reciept, 1996, ACM, vol. 26, pp. 6-17.*

(Continued)

*Primary Examiner*—Kimyen Vu
*Assistant Examiner*—Beemnet W Dada

(57) ABSTRACT

In accordance with certain aspects, a chain of trust is established between a subscriber unit and a content provider. A request is submitted from the subscriber unit to the content provider. A challenge nonce is generated at the content provider and returned to the subscriber unit. At the subscriber unit, an operating system (OS) certificate containing an identity of the operating system from the software identity register, information describing the operating system, the challenge nonce, and a CPU public key is formed, and the OS certificate is signed using a CPU private key. The OS certificate and a CPU manufacturer certificate supplied by a manufacturer of the CPU are passed from the subscriber unit to the content provider, and are evaluated at the content provider to determine whether to reject or fulfill the request.

22 Claims, 7 Drawing Sheets

U.S. PATENT DOCUMENTS

| | | | |
|---|---|---|---|
| 4,908,861 | A | 3/1990 | Brachtl et al. |
| 4,969,189 | A | 11/1990 | Ohta et al. |
| 4,977,594 | A | 12/1990 | Shear |
| 5,007,082 | A | 4/1991 | Cummins |
| 5,023,907 | A | 6/1991 | Johnson et al. |
| 5,050,213 | A | 9/1991 | Shear |
| 5,140,634 | A | 8/1992 | Guillou et al. |
| 5,276,311 | A | 1/1994 | Hennige |
| 5,283,830 | A | 2/1994 | Hinsley et al. |
| 5,335,334 | A | 8/1994 | Takahashi et al. |
| 5,349,643 | A | 9/1994 | Cox et al. |
| 5,365,589 | A | 11/1994 | Gutowitz |
| 5,410,598 | A | 4/1995 | Shear |
| 5,421,006 | A | 5/1995 | Jablon et al. |
| 5,448,716 | A | 9/1995 | Hardell et al. |
| 5,473,690 | A | 12/1995 | Grimonprez et al. |
| 5,473,692 | A | 12/1995 | Davis |
| 5,483,649 | A | 1/1996 | Kuznetsov et al. |
| 5,491,827 | A | 2/1996 | Holtey |
| 5,544,246 | A | 8/1996 | Mandelbaum et al. |
| 5,557,518 | A | 9/1996 | Rosen |
| 5,557,765 | A | 9/1996 | Lipner et al. |
| 5,559,957 | A | 9/1996 | Balk |
| 5,615,263 | A | 3/1997 | Takahashi |
| 5,623,637 | A | 4/1997 | Jones et al. |
| 5,638,446 | A | 6/1997 | Rubin |
| 5,654,746 | A | 8/1997 | McMullan, Jr. et al. |
| 5,664,016 | A | 9/1997 | Preneel et al. |
| 5,671,280 | A | 9/1997 | Rosen |
| 5,721,781 | A | 2/1998 | Deo et al. |
| 5,724,425 | A | 3/1998 | Chang et al. |
| 5,724,527 | A | 3/1998 | Karnik et al. |
| 5,745,886 | A | 4/1998 | Rosen |
| 5,757,919 | A | 5/1998 | Herbert et al. |
| 5,778,069 | A | 7/1998 | Thomlinson et al. |
| 5,796,824 | A | 8/1998 | Hasebe et al. |
| 5,802,592 | A | 9/1998 | Chess et al. |
| 5,812,662 | A | 9/1998 | Hsu et al. |
| 5,812,980 | A | 9/1998 | Asai |
| 5,841,869 | A | 11/1998 | Merkling et al. |
| 5,844,986 | A | 12/1998 | Davis |
| 5,860,099 | A | 1/1999 | Milios et al. |
| 5,870,467 | A | 2/1999 | Imai et al. |
| 5,872,847 | A | 2/1999 | Boyle et al. |
| 5,892,900 | A | 4/1999 | Ginter et al. |
| 5,892,902 | A | 4/1999 | Clark |
| 5,892,904 | A | 4/1999 | Atkinson et al. |
| 5,910,987 | A | 6/1999 | Ginter et al. |
| 5,915,019 | A | 6/1999 | Ginter et al. |
| 5,917,912 | A | 6/1999 | Ginter et al. |
| 5,919,257 | A | 7/1999 | Trostle |
| 5,920,861 | A | 7/1999 | Hall et al. |
| 5,933,498 | A | 8/1999 | Schneck et al. |
| 5,937,063 | A | 8/1999 | Davis |
| 5,940,504 | A | 8/1999 | Griswold |
| 5,943,422 | A | 8/1999 | Van Wie et al. |
| 5,944,821 | A | 8/1999 | Angelo |
| 5,949,876 | A | 9/1999 | Ginter et al. |
| 5,953,502 | A | 9/1999 | Helbig, Sr. |
| 5,958,050 | A | 9/1999 | Griffin et al. |
| 5,963,980 | A | 10/1999 | Coulier et al. |
| 5,974,546 | A | 10/1999 | Anderson |
| 6,026,166 | A | 2/2000 | LeBourgeois |
| 6,028,933 | A * | 2/2000 | Heer et al. ............... 713/169 |
| 6,092,189 | A * | 7/2000 | Fisher et al. ............... 713/1 |
| 6,105,137 | A | 8/2000 | Graunke |
| 6,148,083 | A | 11/2000 | Fieres |
| 6,185,678 | B1 | 2/2001 | Arbaugh |
| 6,189,100 | B1 * | 2/2001 | Barr et al. ............... 713/182 |
| 6,189,103 | B1 | 2/2001 | Nevarez et al. |
| 6,230,285 | B1 * | 5/2001 | Sadowsky et al. ............ 714/14 |
| 6,237,786 | B1 | 5/2001 | Ginter et al. |
| 6,263,431 | B1 * | 7/2001 | Lovelace et al. ............ 713/2 |
| 6,327,660 | B1 | 12/2001 | Patel |
| 6,401,208 | B2 | 6/2002 | Davis et al. |
| 6,453,334 | B1 | 9/2002 | Vinson et al. |
| 6,557,104 | B2 | 4/2003 | Vu et al. |
| 6,735,696 | B1 * | 5/2004 | Hannah ............... 713/189 |
| 7,017,188 | B1 | 3/2006 | Schmeidler et al. |
| 7,047,414 | B2 | 5/2006 | Wheeler et al. |
| 7,103,771 | B2 | 9/2006 | Grawrock |
| 7,188,240 | B1 | 3/2007 | Berstis et al. |
| 7,194,092 | B1 | 3/2007 | England et al. |
| 7,302,709 | B2 | 11/2007 | England |
| 2002/0007452 | A1 | 1/2002 | Traw et al. |
| 2002/0069365 | A1 | 6/2002 | Howard et al. |
| 2002/0107803 | A1 | 8/2002 | Lisanke et al. |
| 2002/0120936 | A1 | 8/2002 | Del Beccaro et al. |
| 2002/0152173 | A1 | 10/2002 | Rudd |
| 2003/0056112 | A1 | 3/2003 | Vinson et al. |
| 2003/0126454 | A1 | 7/2003 | Glew et al. |
| 2003/0163711 | A1 | 8/2003 | Grawrock |
| 2003/0188179 | A1 | 10/2003 | Challener et al. |
| 2004/0003273 | A1 | 1/2004 | Grawrock et al. |
| 2007/0067624 | A1 | 3/2007 | England |
| 2007/0086588 | A1 | 4/2007 | England |
| 2007/0088946 | A1 | 4/2007 | England |
| 2007/0088949 | A1 | 4/2007 | England |
| 2007/0104329 | A1 | 5/2007 | England |

FOREIGN PATENT DOCUMENTS

| | | |
|---|---|---|
| GB | 2260629 | 4/1993 |
| JP | 1040172 A1 | 2/1998 |
| WO | WO9938070 | 7/1999 |

OTHER PUBLICATIONS

Arbaugh, William et al., "Automated Recovery in a Secure Bootstrap Process", *Network and Distributed System Security Symposium, Internet Society*, (Mar. 1998),155-167.

Abadi, et al., "Authentication and Delegation with Smart-cards", Jul. 30, 1992 30 pages.

Arbaugh, "A Secure and Reliable Bootstrap Architecture", 1996 pp. 1-7.

Clark, et al., "BITS: A Smartcard Protected Operating System" Communications on the ACM Nov. 1994 vol. 37 No. 11, pp. 66-94.

Feiertag, et al., "The Foundations of a provably secure operating system( PSOS)", California Proceedings of the National Computer Conference AFIPS Press, 1979, pp. 329-334.

Internet Security: SanDisk and New Microsoft Technology Provide Copy Protected Music for Internet Music Player Market. (Product Annoucement) Edge: Work Group Computing Report Apr. 19, 1999 2 pages.

Kuhn, "The TrustNo1 Cryptoprocessor Concept" Apr. 30, 1997.

Lampson, et al., "Authentication in Distributed Systems: Theory and Practice" Digital Equipment Corporation ACM Transactions on Computer Systems vol. 10 No. 4 Nov. 1992 pp. 265-310.

McKenkie, "Seybold Report on Internet Publishing", v1 n4 p. 6(9) Dec. 1996.

Murphy, et al., "Preventing Piracy: Authorization Software May Ease Hollywood's Fear of the Net" Internet World Magazine Apr. 1, 2000 3 pages.

"Phoenix Technologies Partners with Secure Computing in Enterprise Security Marketplace" Jul. 2, 2001 Business Wife Courtesy of Dialog Text Search pp. 1-2.

Schneier, "Applied Cryptography" Applied Cryptography Protocols Alogrith and Source Code in C. 1996 pp. 574-577.

Stallings(2), "Cryptography and Network Security", 1992, 2nd Edition, pp. 186-187.

Stallings, "Cryptography and Network Security", 1999, Prentice Hall, 2nd Edition, pp. 143-147.

Yee, "Using Secure Coprocessors" School of Computer Science Carnegie Mellon University 1994 pp. i-vi 1-94.

Young, "Facing An Internet Security Minefield Microsoft Hardens NT Server's Defenses" Windows Watcher Sep. 12, 1997 Issue 9 8 pages.

Housley, R "Internet X.509 Public Key Infrastructure Certificate and CRL Profile", 1-3.

Muller-Schloer, Christian " A Microprocessor-based Cryptoprocessor", vol. 3 Issue 5, (Oct. 31, 1983),5-15.

""Non-Final Office Action", U.S. Appl. No. 10/431,011, (Jun. 1, 2007),", U.S. Appl. No. 10/431,011, (Jun. 1, 2007),1-6.

* cited by examiner

| | Boot Block Public Key |
| Authenticated | 2.01 |
| Boot Key | Boot Block Digest |
| Generator Seed | Boot Block version 1.1 |
| | OS NT 5.1 |
| | SP3 |
| | Matrox Driver v1.03, digest |
| | Creative Driver 4.01, digest |

130 — Authenticated Boot Key Generator Seed
132 — (column of values)
70

SYSTEM AND METHOD FOR AUTHENTICATING AN OPERATING SYSTEM TO A CENTRAL PROCESSING UNIT, PROVIDING THE CPU/OS WITH SECURE STORAGE, AND AUTHENTICATING THE CPU/OS TO A THIRD PARTY

RELATED APPLICATIONS

This application is a continuation of U.S. patent application Ser. No. 09/266,207, filed Mar. 10, 1999, which is hereby incorporated by reference herein. U.S. patent application Ser. No. 09/266,207 is a non-provisional application claiming priority to U.S. provisional patent application Ser. No. 60/105,891 filed on Oct. 26, 1998, which is herein incorporated by reference, and is related to co-pending applications titled "Loading And Identifying A Digital Rights Management Operating System," U.S. patent application Ser. No. 09/227,611, now U.S. Pat. No. 6,327,652, "Key-based Secure Storage," U.S. patent application Ser. No. 09/227,568, "Digital Rights Management," U.S. patent application Ser. No. 09/227,559, now U.S. Pat. No. 6,820,063, and "Digital Rights Management Operating System," U.S. patent application Ser. No. 09/227,561, now U.S. Pat. No. 6,330,670, all filed on Jan. 8, 1999 and assigned to the same assignee as the present application.

FIELD OF THE INVENTION

This invention relates to computer-implemented authentication systems and methods for authenticating an operating system (OS) to a processor during its boot sequence in order to establish a chain of trust rooted in the combination of the OS and the processor on which it is running. The invention can be used in conjunction with digital rights management systems to establish trust with a content provider. This invention further relates to techniques for securely maintaining the digital content in persistent local memory (such as on disk) while preventing rogue operating systems and applications from illicitly accessing the content.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright ©1998, Microsoft Corporation, All Rights Reserved.

BACKGROUND

More and more content is being delivered in digital form, and more and more digital content is being delivered online over private and public networks, such as Intranets and the Internet. For a client, digital form allows more sophisticated content, while online delivery improves timeliness and convenience. For a publisher, digital content also reduces delivery costs. Unfortunately, these worthwhile attributes are often outweighed in the minds of publishers by the corresponding disadvantage that online information delivery makes it relatively easy to obtain pristine digital content and to pirate the content at the expense and harm of the publisher.

Piracy of digital content, especially online digital content, is not yet a great problem. Most premium content that is available on the Web is of low value, and therefore casual and organized pirates do not yet see an attractive business stealing and reselling content. Increasingly, though, higher-value content is becoming available. Books and audio recordings are available now, and as bandwidths increase, video content will start to appear. With the increase in value of online digital content, the attractiveness of organized and casual theft increases.

The unusual property of digital content is that the publisher (or reseller) gives or sells the content to a client, but continues to restrict rights to use the content even after the content is under the sole physical control of the client. For instance, a publisher will typically retain copyright to a work so that the client cannot reproduce or publish the work without permission. A publisher could also adjust pricing according to whether the client is allowed to make a persistent copy, or is just allowed to view the content online as it is delivered. These scenarios reveal a peculiar arrangement. The user that possesses the digital bits often does not have full rights to their use; instead, the provider retains at least some of the rights.

"Digital rights management" is therefore fast becoming a central requirement if online commerce is to continue its rapid growth. Content providers and the computer industry must quickly address technologies and protocol for ensuring that digital content is properly handled in accordance with the rights granted by the publisher. If measures are not taken, traditional content providers may be put out of business by widespread theft, or, more likely, will refuse altogether to deliver content online.

Traditional security systems ill serve this problem. There are highly secure schemes for encrypting data on networks, authenticating users, revoking certificates, and storing data securely. Unfortunately, none of these systems address the assurance of content security after it has been delivered to a client's machine. Traditional uses of smart cards offer little help. Smart cards merely provide authentication, storage, and encryption capabilities. Ultimately, useful content must be assembled within the host machine for display, and again, at this point the bits are subject to theft. Cryptographic coprocessors provide higher-performance cryptographic operations, and are usually programmable but again, fundamentally, any operating system or sufficiently privileged application, trusted or not, can use the services of the cryptographic processor.

There appear to be three solutions to this problem. One solution is to do away with general-purpose computing devices and use special-purpose tamper-resistant boxes for delivery, storage, and display of secure content. This is the approach adopted by the cable industry and their set-top boxes, and looks set to be the model for DVD-video presentation. The second solution is to use secret, proprietary data formats and applications software, or to use tamper-resistant software containers, in the hope that the resulting complexity will substantially impede piracy. The third solution is to modify the general-purpose computer to support a general model of client-side content security and digital rights management.

A fundamental building block for client-side content security is a secure operating system. If a computer can be booted only into an operating system that itself honors content rights, and allows only compliant applications to access rights-restricted data, then data integrity within the machine can be assured. This stepping-stone to a secure operating system is sometimes called "Secure Boot." If secure boot cannot be assured, then whatever rights management system the secure OS provides, the computer can always be booted into an insecure operating system as a step to compromise it.

Secure boot of an operating system is usually a multi-stage process. A securely booted computer runs a trusted program at startup. The trusted program loads an initial layer of the operating system and checks its integrity (by using a code signature or by other means) before allowing it to run. This layer will in turn load and check the succeeding layers. This proceeds all the way to loading trusted (signed) device drivers, and finally the trusted application(s).

An article by B. Lampson, M. Abadi, and M. Burrows, entitled "Authentication in Distributed Systems: Theory and Practice," ACM Transactions on Computer Systems v10, 265, 1992, describes in general terms the requirements for securely booting an operating system. The only hardware assist is a register that holds a machine secret. When boot begins this register becomes readable, and there's a hardware operation to make this secret unreadable. Once it's unreadable, it stays unreadable until the next boot. The boot code mints a public-key pair and a certificate that the operating system can use to authenticate itself to other parties in order to establish trust.

Clark and Hoffman's BITS system is designed to support secure boot from a smart card. P. C. Clark and L. J. Hoffman, "BITS: A Smartcard Operating System," Comm. ACM. 37, 66, 1994. In their design, the smart card holds the boot sector, and PCs are designed to boot from the smart card. The smart card continues to be involved in the boot process (for example, the smart card holds the signatures or keys of other parts of the OS).

Bennet Yee describes a scheme in which a secure processor first gets control of the booting machine. B. Yee, "Using Secure Coprocessors", Ph.D. Thesis, Carnegie Mellon University, 1994. The secure processor can check code integrity before loading other systems. One of the nice features of this scheme is that there is a tamper-resistant device that can later be queried for the details of the running operating system.

Another secure boot model, known as AEGIS®, is disclosed by W. Arbaugh, D. G. Farber, and J. M Smith in a paper entitled "A Secure and Reliable Bootstrap Architecture", Univ. of Penn. Dept. of CIS Technical Report, IEEE Symposium on Security and Privacy, page 65, 1997. This AEGIS® model requires a tamper-resistant BIOS that has hard-wired into it the signature of the following stage. This scheme has the very considerable advantage that it works well with current microprocessors and the current PC architecture, but has three drawbacks. First, the set of trusted operating systems or trusted publishers must be wired into the BIOS. Second, if the content is valuable enough (for instance, e-cash or Hollywood videos), users will find a way of replacing the BIOS with one that permits an insecure boot. Third, when obtaining data from a network server, the client has no way of proving to the remote server that it is indeed running a trusted system.

On the more general subject of client-side rights management, several systems exist or have been proposed to encapsulate data and rights in a tamper-resistant software package. An early example is IBM®'s Cryptolope®. Another existent commercial implementation of a rights management system has been developed by Intertrust. In the audio domain, AT&T Research have proposed their "A2b®" audio rights management system based on the PolicyMaker rights management system.

SUMMARY

This invention concerns a system and method for distributing digital data to a client and handling the digital data at the client in accordance with the rights granted by the publisher. Generally, the system involves a general-purpose microprocessor that enables a new mechanism that facilitates an authenticated boot sequence in which the operating system can prove its identity to the microprocessor. The boot sequence provides the building blocks for client-side rights management when the system is online, and provides for continued protection of persistent data even when the user goes offline.

In one implementation, the client or subscriber-side computer system has a central processing unit (CPU) and an operating system (OS). The CPU is manufactured with a public-key pair, a manufacturer certificate testifying that the manufacturer built the CPU according to a known specification, and a software identity register. The operating system includes a block of code, referred to as the "boot block". The boot block uniquely describes the operating system in that it will boot that operating system and no other. An OS identity can be established from the boot block by examining a digital signature stored with the boot block or by computing a hash digest of the boot block.

During booting, the CPU executes the boot block as an atomic operation to store the identity of the operating system into the software identity register. Execution of the boot block is such that the software identity register, which can be read but not modified, is set to either the OS identity (i.e., boot block digest or OS public key) if the operation is successful, or zero if some event or circumstance subverts operation.

Rooted in this self-authentication, the OS can then continue to load and validate other blocks of code (including device drivers to be executed). An identity of each block of code that is successfully validated is appended to a boot log.

Following this authenticated boot sequence, the subscriber unit is prepared to establish a chain of trust to prove its hardware and software to a content provider. The CPU in the subscriber unit begins by submitting a request for content maintained at the content provider.

In response to the request, the content provider generates a challenge nonce and returns the challenge nonce to the subscriber unit. The subscriber unit forms an OS certificate that contains the OS identity (held in its software identity register), the boot log, the challenge nonce, and the CPU public key. The CPU signs this newly minted OS certificate using the CPU private key. The subscriber unit returns this OS certificate, along with the CPU manufacturer certificate, to the content provider. The content provider then has sufficient information to identify the OS and other software components identified in the log, and the processor, and to determine whether to trust this combination of software and hardware. If trust is established, the content provider can choose to download the content to the subscriber unit, along with a list of terms under which the content may be used. This list may be in the form of a license or an Access Control List (ACL), specifying by which processor, by which OS, by which application(s), and under which additional terms the content may be used.

The subscriber unit stores the content in encrypted form using a storage key that is generated as a function of CPU-specific and OS-specific data. More particularly, the CPU forms a generator seed from a CPU-specific secret, a user-supplied seed, and OS-specific data from the OS identity register. The generator seed, the CPU-specific key, and the OS digest are input to a hash function to generate a unique storage key. The storage key is then used to encrypt the content. In this manner, only the same CPU and OS that have proven themselves to the content provider are able subsequently to access the data previously encrypted.

Alternatively, the processor may contain a fixed per-processor symmetric key $K_S$ which can be used to encrypt a data structure containing content along with a statement of the conditions under which it may be decrypted; key $K_S$ is also used to decrypt the data structure, test the conditions, and either return the content or fail. Key $K_S$ is to be used only for this pair of operations, which are referred to as "Seal" and "Unseal".

In both of these scenarios for providing secure storage, a key pair $K_{CPU}$ and $K_{CPU}^{-1}$ unique to the CPU need be capable only of signing, not for encryption. Alternatively, if the key pair $K_{CPU}$ and $K_{CPU}^{-1}$ is capable of encryption and decryption as well, ordinary user-level software can implement the "Seal" operation, even on another processor, and $K_{CPU}^{-1}$ can be used to implement the "Unseal" operation.

BRIEF DESCRIPTION OF THE DRAWINGS

The same numbers are used throughout the drawings to reference like components or features.

DETAILED DESCRIPTION

The following discussion assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996), which is hereby incorporated by reference.

This invention concerns a system and method for distributing digital data to a client and handling the digital data at the client in accordance with the rights granted by the publisher. In the most basic scenario, a content provider agrees to deliver digital content to a subscriber unit, provided that the subscriber unit promises not to violate the associated terms for using the digital data and that the content provider can trust the subscriber unit's promise. For instance, the content provider delivers content to the subscriber unit with the understanding that the subscriber unit will not redistribute the content, reproduce the content, or utilize the content in violation of a predefined use agreement between the content provider and the subscriber unit.

The content may be essentially any type of content that can be expressed as digital data, including video, still pictures, audio, graphical images, and textual data or executable content (computer programs). Examples of possible content include feature-length movies, TV shows, games, software programs, news, stock information, weather reports, art, photographs, and so on.

To place this in a particular context for discussion purposes, suppose the content provider 22 is a producer of feature films. Assume that the content provider f22 offers its animated movies at two different prices a low price for the right to view the movie one time as it is delivered online (i.e., akin to pay-per-view) and a higher price for the right to view the movie as often as the subscriber likes (i.e., akin to video purchase). In each case, the agreement specifically prohibits reproduction of the movie or redistribution of the movie to another subscriber unit. In the first case, it also prohibits the client device from making a persistent copy to disk. For the content provider 22 to download a requested movie, it must trust that the subscriber unit will abide by the agreement and not permit illicit use of the digital movie data. This trust involves trust of the hardware components, trust of the operating system, and trust of the applications, as well as trust of the manufacturer of the hardware and software.

Figure 1:
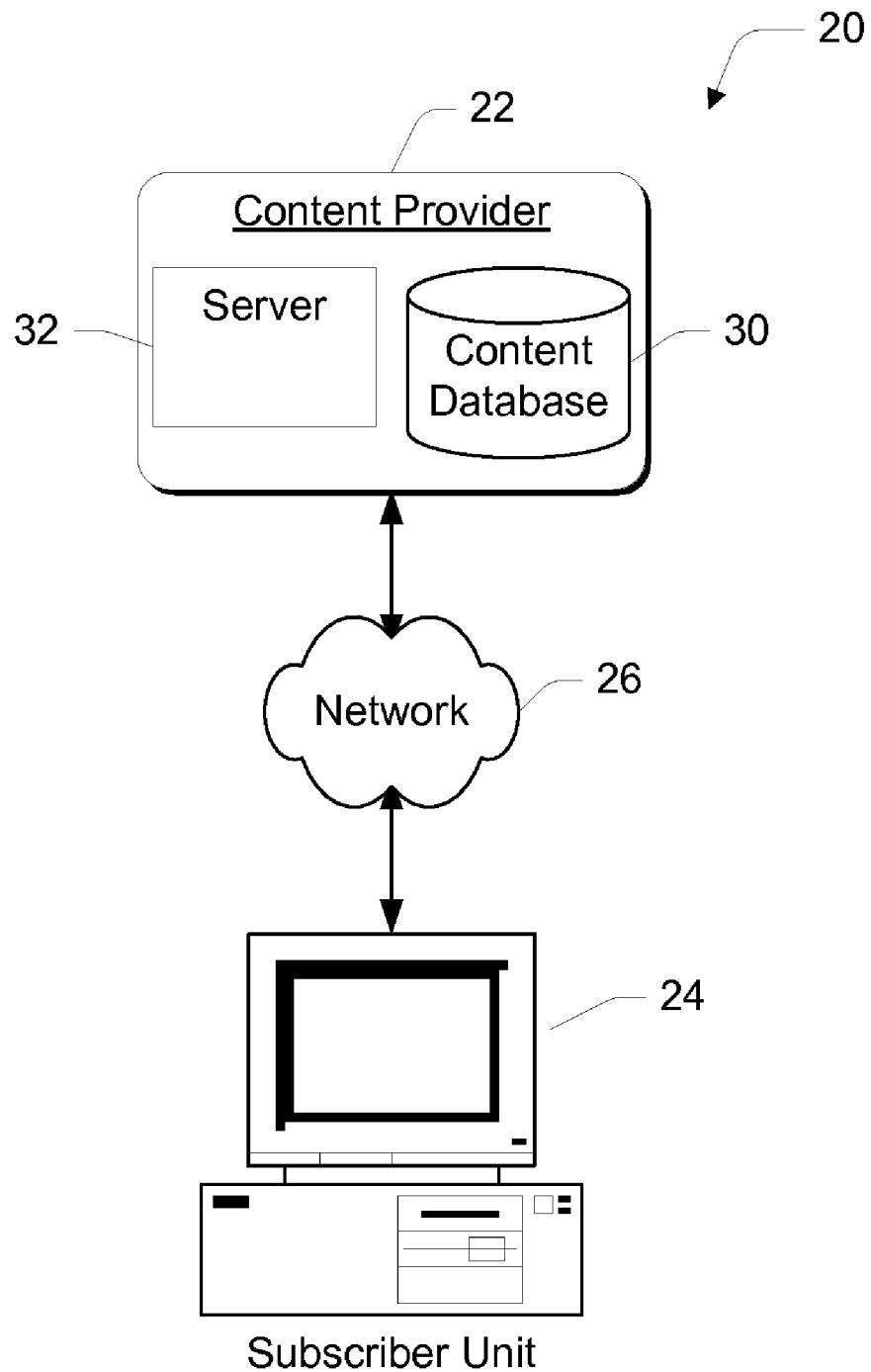
FIG. 1 is a diagrammatic illustration of a system having a subscriber unit and a content provider.

FIG. 1 shows a system 20 having a content provider 22 that is capable of delivering digital content to a subscriber unit 24 over a network 26. The content provider 22 has a content database 30 that stores the content and a media server 32 that serves the content to the subscriber unit 24. The media server may be configured to download the entire content as a file, or to stream the content continuously over the network. As an example, the content provider may implement a server computer system comprising one or clustered server computers that handle requests from subscribers, manage the digital files locally, and facilitate delivery of requested digital files over the network 26 to the subscriber unit 24.

The subscriber unit 24 is coupled to receive the digital content from the network 26. The subscriber unit 24 is illustrated as a general-purpose computer that is linked to the network 26 via a network connection, a digital cable interface, a modem, or other interface. The subscriber computer has memory to buffer or to store the digital content received from the content provider, a monitor to display any visual content (video, pictures, images, text, etc.), and a sound system (not shown) to play audio content. The subscriber unit may be implemented, however, as other devices that are capable of receiving and presenting digital content. For instance, the subscriber unit 24 might be a television, or a television/set-top box system, or a portable-computing device (e.g., laptop, palmtop, portable information device, Web-enabled phone, etc.).

The network 26 is representative of many diverse types of networks, including wire-based networks, such as an enterprise network (e.g., a local area network, wide area network) or a public network (e.g., the Internet), and wireless networks (e.g., satellite network, RF network, microwave). The network 26 can also be implemented as a telephone network, or an interactive television network, or any other form for linking the subscriber unit 24 to the content provider 22.

Exemplary Subscriber Unit

Figure 2:
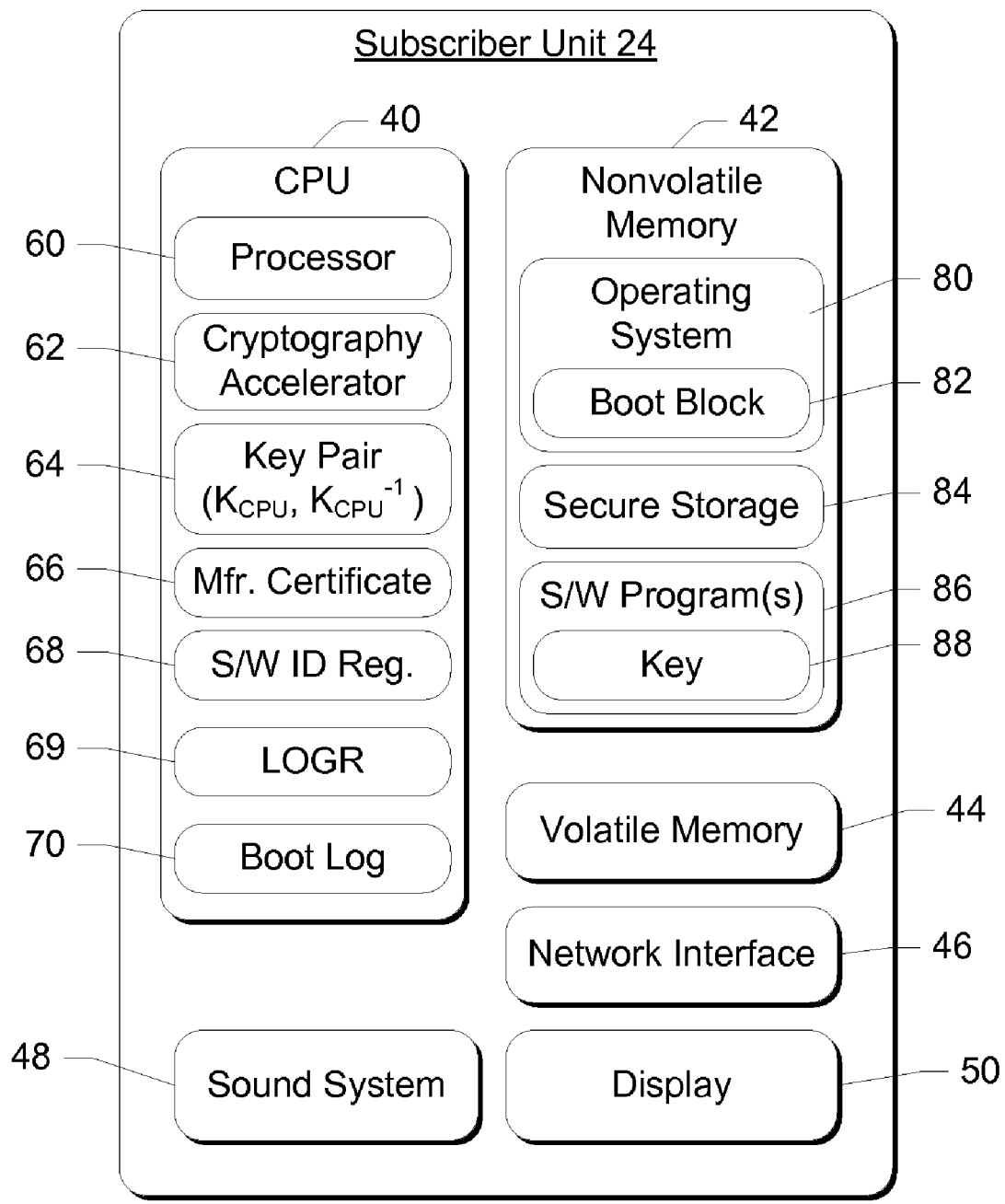
FIG. 2 is a block diagram of the subscriber unit.

FIG. 2 shows general components in the subscriber unit 26. They include a central processing unit (CPU) 40, nonvolatile memory 42 (e.g., ROM, disk drive, CD ROM, etc.), volatile memory 44 (e.g., RAM), and a network interface 46 (e.g., modem, network port, wireless transceiver, etc.). The subscriber unit 26 may also include a sound system 48 and/or a display 50. These components are interconnected via conventional busing architectures, including parallel and serial schemes (not shown).

The CPU 40 has a processor 60 and may have a cryptographic accelerator 62. The CPU 40 is capable of performing cryptographic functions, such as signing, encrypting, decrypting, and authenticating, with or without the accelerator 62 assisting in intensive mathematical computations commonly involved in cryptographic functions.

The CPU manufacturer equips the CPU 40 with a pair of public and private keys 64 that is unique to the CPU. For discussion purpose, the CPU's public key is referred to as "$K_{CPU}$" and the corresponding private key is referred to as "$K_{CPU}^{-1}$". Other physical implementations may include storing the key on an external device to which the main CPU has privileged access (where the stored secrets are inaccessible to arbitrary application or operating systems code). The private key is never revealed and is used only for the specific purpose of signing stylized statements, such as when responding to challenges from the content provider, as is discussed below in more detail. The CPU manufacturer may further embed a second secret key $K_2$ in the CPU 40 or other secure hardware. The second key is distinct from the first key pair, and is used to generate a secure storage key, as is described blow under the heading "Secure Storage". Alternatively, as described below, a symmetric key $K_S$ may be used with "Seal" and "Unseal" operations to encrypt a data structure along with a statement of the conditions under which the data structure may be decrypted.

The manufacturer also issues a signed certificate 66 testifying that it produced the CPU according to a known specification. Generally, the certificate testifies that the manufacturer created the key pair 64, placed the key pair onto the CPU 40, and then destroyed its own knowledge of the private key "$K_{CPU}^{-1}$". In this way, nobody but the CPU knows the CPU private key $K_{CPU}^{-1}$; the same key is not issued to other CPUs. The certificate can in principle be stored on a separate physical device but still logically belongs to the processor with the corresponding key.

The manufacturer has a pair of public and private signing keys, $K_{MFR}$ and $K_{MFR}^{-1}$. The private key $K_{MFR}^{-1}$ is known only to the manufacturer, while the public key $K_{MFR}$ is made available to the public. The manufacturer certificate 66 contains the manufacturer's public key $K_{MFR}$, the CPU's public key $K_{CPU}$, and the above testimony. The manufacture signs the certificate using its private signing key, $K_{MFR}^{-1}$, as follows:

Mfr. Certificate=($K_{MFR}$, Certifies-for-Boot, $K_{CPU}$), signed by $K_{MFR}^{-1}$ The predicate "certifies-for-boot" is a pledge by the manufacturer that it created the CPU and the CPU key pair according to a known specification. The pledge further states that the CPU can correctly perform authenticated boot procedures, as are described below in more detail. The manufacturer certificate 66 is publicly accessible, yet it cannot be forged without knowledge of the manufacturer's private key $K_{MFR}^{-1}$.

Another implementation in which a 'chain of certificates' leading back to a root certificate held by the processor manufacturer is also acceptable.

The CPU 40 has an internal software identity register (SIR) 68, which is cleared at the beginning of every boot. The CPU executes an opcode "BeginAuthenticatedBoot" or "BAB" to set an identity of a corresponding piece of software, such as operating system 80, and stores this identity in the SIR; the boot block of the operating system (described below) is atomically executed as part of the BAB instruction. If execution of the BAB opcode and the boot block fails (e.g., if the execution was not atomic), the SIR 68 is set to a predetermined false value (e.g., zero). This process is described below in more detail under the heading "Authenticated Boot".

The CPU 40 also utilizes a second internal register (LOGR) 69, which holds contents produced as a result of running a LOG operation. This operation, as well as the register, is described below in more detail.

The CPU 40 also maintains a "boot log" 70 to track software modules and programs that are loaded. In one implementation, the boot log 70 is a log in an append-only memory of the CPU that is cleared at the beginning of every boot. Since it consumes only about a few hundred bytes, the boot log 70 can be comfortably included in the main CPU. Alternatively, the CPU 40 can store the boot log 70 in volatile memory 44 in a cryptographic tamper-resistant container.

A further implementation is by means of a software module that allows each section of the booting operating system to write entries into the boot log that cannot be removed by later components without leaving evidence of tampering. Yet alternatively, the SIR can hold a cryptographic digest of a data structure comprising the initial boot block and the subsequent contents of the boot log. The operation of appending to the boot log (call this operation "Extend") replaces the SIR with the hash of the concatenation of the SIR and the entry being appended to the boot log. A straightforward implementation of this operation may be seen to modify the SIR, potentially disallowing future "Unseal" operations that depend on the value of the SIR. Note, however, that the operating system, when booting, can choose to add elements to the boot log without loading the corresponding components, and so a more privileged combination of software components can impersonate a less privileged one. This allows the controlled transfer of secrets across privilege levels. In this approach, software will keep its own plaintext copy of the boot log entries, along with the initial value of the SIR following boot, and this plaintext copy is validated by knowledge of the current composite SIR.

As an optimization, regardless of the implementation of the boot log, the OS may choose not to extend the boot log with the identities of certain software components, if these components are judged to be as trustworthy as the OS itself, or if they will execute only in a protected environment from which they will be unable to subvert operation.

The operating system (OS) 80 is stored in the memory 42 and executed on the CPU 40. The operating system 80 has a block of code 82 used to authenticate the operating system on the CPU during the boot operation. The boot block 82 uniquely determines the operating system, or class of operating systems (e.g. those signed by the same manufacturer). The boot block 82 can also be signed by the OS manufacturer.

Figures 3, 5:
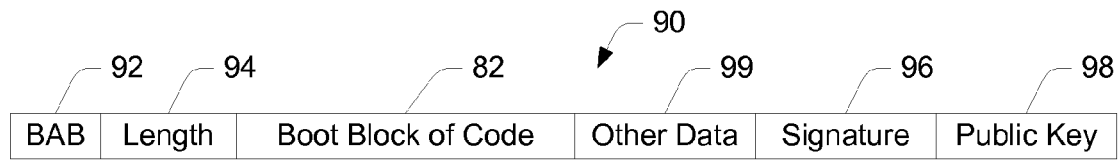
FIG. 3 illustrates a signed boot block.
FIG. 5 illustrates a boot log created during booting of an operating system on the subscriber unit.

FIG. 3 shows an example of a signed boot block 90 created by signing the block of code 82. It contains the BeginAuthenticatedBoot opcode 92, a length 94 specifying the number of byte in the block of code, the code 82, a signature 96, and a public key 98 used to verify the signature 96. The boot block will also contain as a constant or set of constants, keys, or other information 99 that is used to validate the subsequent operating system components (for instance a public key or keys). In this implementation, the CPU will set the SIR to the public key of the boot block, but only if the boot block code signature is correct for the stated boot block public key.

In an alternative implementation, the SIR is set to the cryptographic hash or digest of the code and constants that make up the boot block. The signature 96 and public key 98 are then not needed.

A key observation of both of these implementations is that no one can boot an untrusted operating system in which the SIR is set to the value of a trusted operating system.

Once booted the operating system 80 and the applications named in the license or ACL by the content provider can set aside space 84 in memory or disk 42 to hold the digital content from the content provider in a secure manner, without fear of other operating systems or rogue applications reading the data in the space. The persistent content is protected by encryption using a key that is generated based in part upon a seed supplied by an authenticated and trusted OS, in part by a secret key stored in the CPU, and in part by the software identity register (SIR). (Alternatively, the persistent content is stored using the "Seal" and "Unseal" operations, described below in more detail, or using the processor's public key pair for encryption.) The persistent content is stored with a license or ACL naming the applications that can use the content and the terms under which they can use it.

Software programs 86 (the applications) are also shown stored in memory 42. These programs may be used to render or otherwise play the content. Each program 86 has an associated key or digest 88 for unique identification.

Authenticated Boot

Traditional approaches to secure boot attempt to secure the BIOS or other loader, and have the BIOS check later components before allowing them to execute. In contrast to this traditional approach, the authenticated boot process allows any software at any point in the boot sequence to initiate an authenticated boot.

Figure 4:
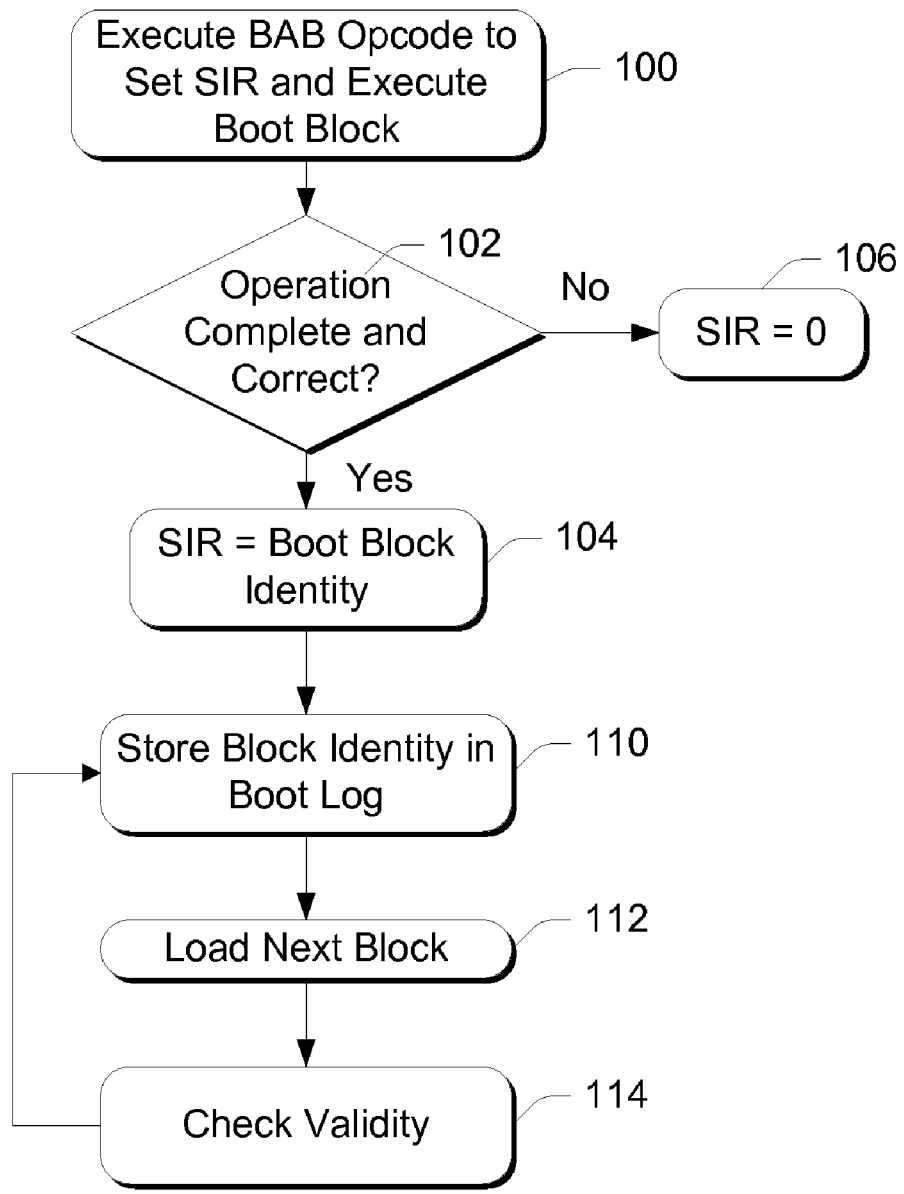
FIG. 4 is a flow diagram showing a method for performing an authenticated boot operation on the operating system.

FIG. 4 shows a method for performing an authenticated boot operation on the operating system 80. The method is performed by the CPU 40 and OS 80 resident in the subscriber unit 24. At block 100, the CPU executes the BeginAuthenticatedBoot opcode 92 in the signed boot block 90 to set an identity for the operating system 80. The identity can be a digest of the boot block's opcodes and data, or the public key 98 corresponding to a signature on the boot block of the operating system.

The BeginAuthenticatedBoot opcode 92 and the boot block 90 execute as one atomic operation, with the implication that if they execute completely and correctly, the resulting operating system can be trusted. Measures are taken to ensure that the CPU is not interrupted and that the boot code that has just been validated cannot be modified. This can involve locking the memory bus and switching off interrupts. It could also involve having the CPU watch for interrupts or for writes by other bus agents and invalidate the authenticated boot sequence if they occur. The BAB opcode 92 can be executed at any time, with one exemplary time being at the start of the OS loader, right after the OS-selector executes. An alternative implementation is to provide both a BeginAuthenticatedBoot (BAB) and an EndAuthenticatedBoot (EAB) instruction. The BAB instruction computes the secure hash of the boot block and the EAB instruction sets the SIR if the execution of the boot block was not interrupted or potentially modified by memory writes from another processor or another bus master.

Execution of the BeginAuthenticatedBoot opcode 92 sets the internal software identity register 70 to either (1) the OS's identity (i.e., boot block digest or OS public key 98) if the operation is successful, or (2) zero if some event or circumstance has potentially subverted operation. Assuming the operation is successful (i.e., the "yes" branch from block 102), the SIR 70 is now a unique number or other value that represents the identity of the operating system 80 (block 104). Any two processors running the same operating system will produce the same SIR. If the BAB opcode operation is unsuccessful (i.e., the "no" branch from block 102), the SIR is set to zero (block 106).

It is noted that different operating systems may be serially booted on the subscriber unit 24. Executing the BAB opcode 92 for different signed OS boot blocks results in different SIR values. However, it is possible for multiple boot blocks to result in the same SIR, when desired.

At block 110, the CPU 40 fills the first entry on the boot log 70 with the public key (or digest) of the boot block 82. From now on, any running code can append data to the boot log 70, and it is generally used by code in the boot chain to identify code versions as they are loaded and executed. As noted earlier, appending data to the boot log can be simulated by modifying the SIR via the "Extend" operation.

The boot block 82 is free to load the next set of blocks in the boot-chain (block 112). At block 114, the boot block 82 checks the validity of the modules (by signature or other means) and loads them so that they can be executed. An identity for each module is appended to the boot log 70. The OS will also retain additional information on components that it loads (e.g., version numbers, device driver IDs, etc.). Loading and executing the code may result in loading more code, validating it, and executing it, etc. This process continues through to the loading of device drivers. When the boot sequence is complete, the OS is operational and the software identity register and the boot log store non-modifiable data captured during the boot sequence. We can recommence loading new device drivers at any point, possibly causing the operating system to become less privileged, with the possible termination of access to protected content.

The CPU can generate a signed certificate containing the boot log data to attest to the particular operating system (including drivers) that is running. It could also generate a signed statement containing just the SIR. FIG. 5 shows an exemplary structure of a boot log 70. It contains a seed field 130 and a block ID field 132. The block ID field 132 holds identities of the blocks of code that are loaded and verified on the subscriber unit. The block ID field 132 can hold text or binary data.

The SIR or the seed field 130 holds an authenticated boot key generator seed. The CPU uses the seed in field 130 to generate keys unique to the OS and processor. Since the first entry of the boot log 70 can only be generated by the execution of a particular boot block or the holder of the boot block private key, the keys can only be re-generated by the same OS, or another OS from the same publisher under control of the publisher. OS-specific key generation provides a building block for secure persistent storage of data and the continued enforcement of digital usage rights even if the computer is physically compromised, or the computer is booted into another operating system. Use of OS-specific storage keys for secure storage is described below in more detail under the heading "Secure Storage".

Alternatively, the processor may use the "Seal" and "Unseal" instructions to store persistent protected content, or when possible may encrypt it with the processor's public key and decrypt it with the "Unseal" instruction, which is called "Reveal" when used with public keys. These operations are described below in more detail under the heading "Secure Storage".

Chain of Trust to Content Provider

Once the CPU has derived an appropriate SIR for the operating system, the combination of the CPU and the OS has a unique identification that may be presented to third parties. The subscriber unit is thus prepared to order content from the content provider, to specify the CPU and the OS, and prove the identity of the CPU and operating system to the content provider.

Figure 6A:
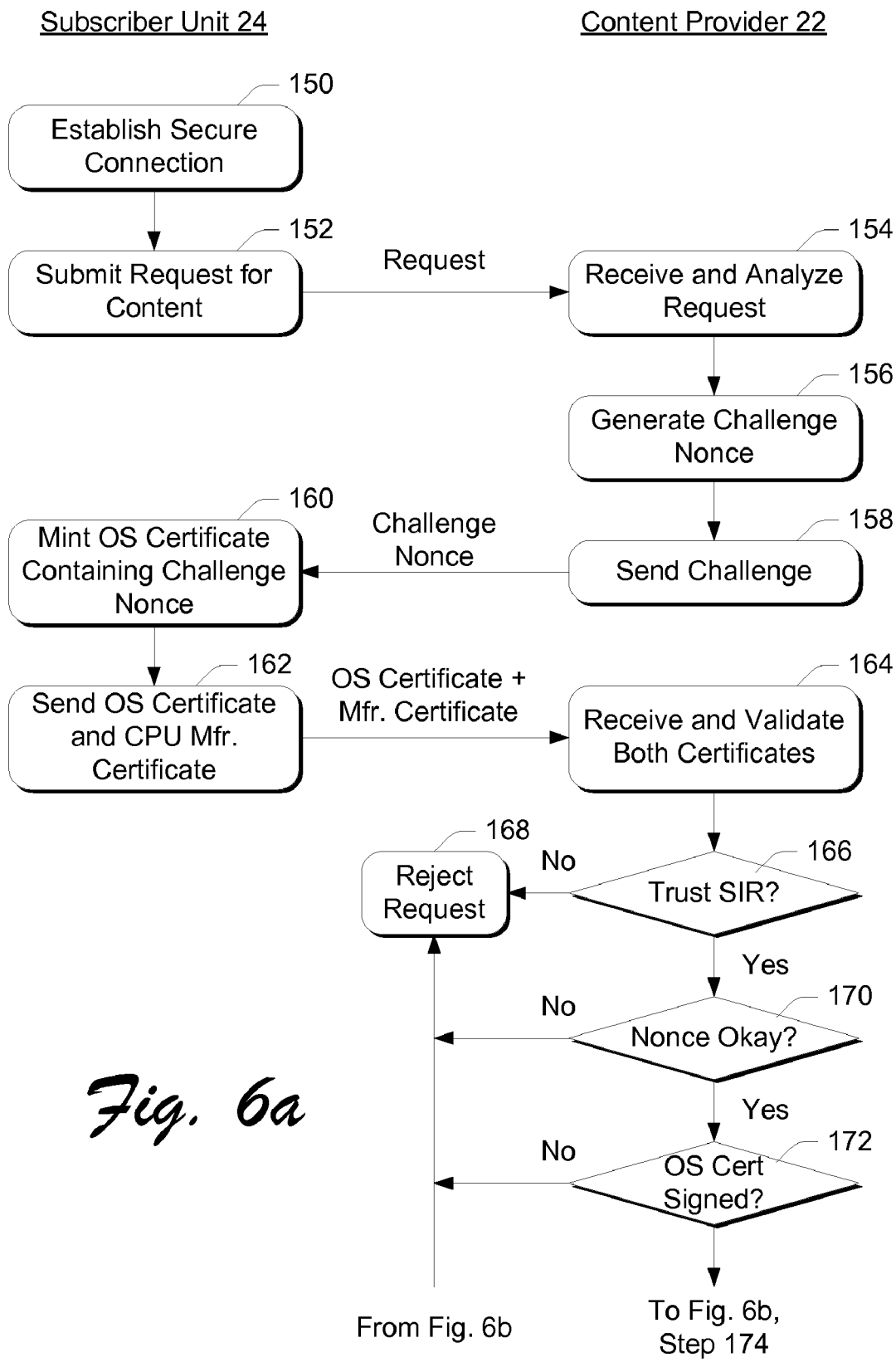
FIGS. 6a and 6b are a flow diagram showing a method for proving a CPU and operating system resident at the subscriber unit to the content provider.
Figure 6B:
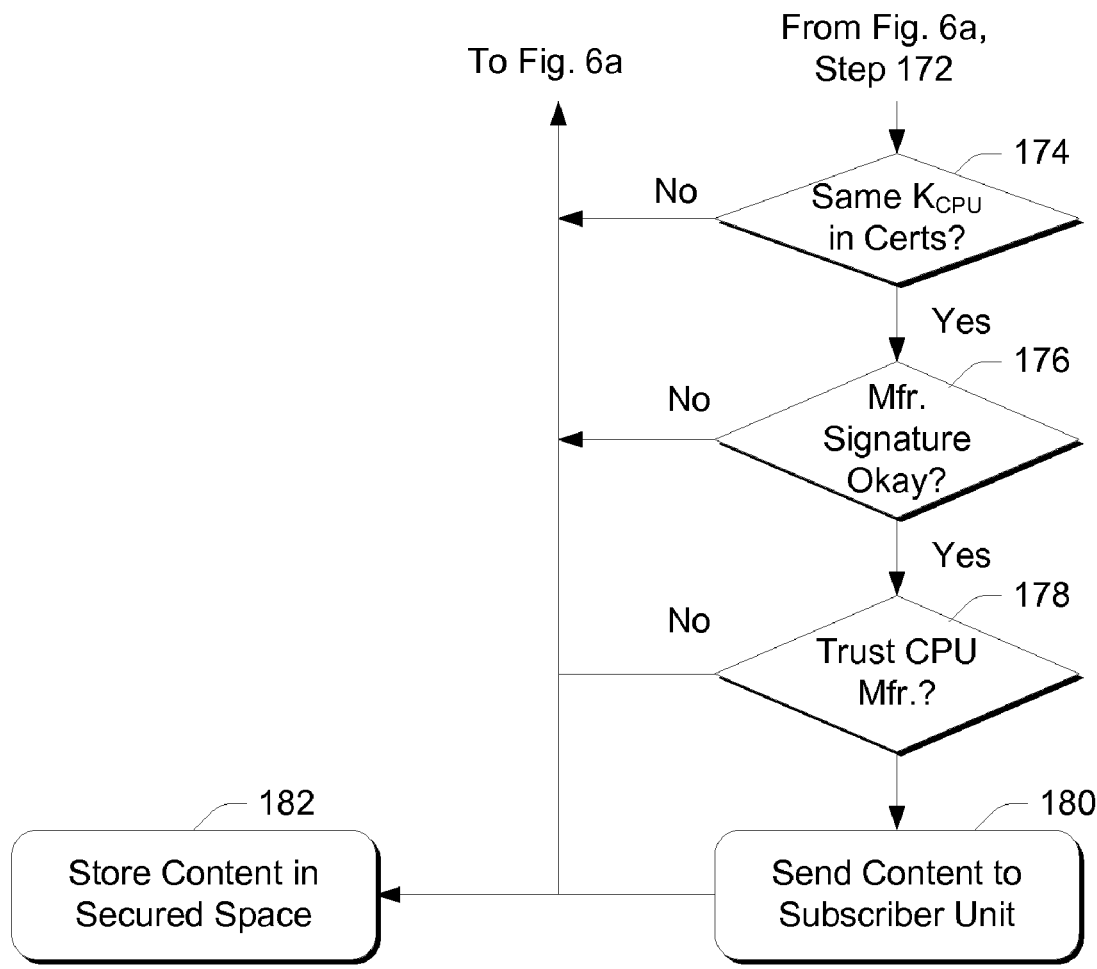

FIGS. 6a and 6b show a method for proving the CPU 40 and OS 80 to the content provider 22 in order for the content provider 22 to trust that these components will abide by the digital rights agreement. The method is described with additional reference to FIGS. 1, 2, 3, and 5. The method is performed by software components resident at both the subscriber unit 24 and the content provider 22 and are listed in FIGS. 6a and 6b under corresponding headings to illustrate generally where the method is performed.

At block 150, the operating system 80 establishes an SSL (secure socket layer) connection, or a similar secure connection, with the content provider 22. This connection is conventional and establishes a cryptographically secured communication path over an otherwise insecure network 26. The path prevents others from intercepting, modifying, replaying or deciphering messages being exchanged between the subscriber unit 24 and the content provider 22.

At block 152, the subscriber unit 24 submits a request for particular content provided by the content provider 22. The request contains an identification of the content, the CPU, the OS, the application, the desired rights to play the content (e.g., rent, purchase, multi-site use, etc.), and payment instructions (or authorization to pay) for the specified rights. Suppose that the user wants to rent a particular movie. In the Internet context, the user may invoke a browser to browse a catalog of movies offered at a Web site owned by the film company that produced the movie. Through the browser interface, the user selects the movie, selects a rental option, and authorizes payment of the rental fee. The browser software causes the request to be sent to the film company.

At block 154, the content provider 22 receives the request and analyzes it. The content provider generates a challenge nonce "Challenge-N" to question the subscriber unit for proof of its processor and of the operating system it is running (block 156). A different challenge nonce is generated for each request so that the server can identify the challenge nonce when it is returned by the subscriber unit. The content provider 22 sends the challenge nonce to the subscriber unit 24 (block 158).

At block 160, upon receipt of the challenge nonce, the CPU 40 mints an OS certificate that contains the challenge nonce from the content provider and an identity of the OS. The OS certificate takes the following form:

OS Certificate=(SIR, Reply, Challenge-$N$, $K_{CPU}$)
signed by $K_{CPU}^{-1}$

In addition to the challenge nonce, the OS certificate contains the SIR value, a reply, and the CPU's public key $K_{CPU}$. The "reply" can optionally contain all of the data written to the boot log 70 so that the content provider can evaluate what software components are currently loaded and executing. In other cases, the content providers could just trust the OS publisher (and hence simply the value of the SIR). The OS certificate is signed using the CPU's private key $K_{CPU}^{-1}$. Effectively, the OS certificate says "The processor named $K^{CPU}$ was running the Operating System SIR with the specified boot log when it received the challenge Challenge-N". (In the case where the boot log is included, the CPU is including more information, effectively saying "Further, it was running this OS revision, with these version components, and these device drivers.")

The CPU 40 uses the key pair $K_{CPU}$, $K_{CPU}^{-1}$ only for this operation, or for other similarly restricted classes of operations; the CPU is unable to sign an arbitrary block of data. As a result, there is no way that the CPU or another party could falsify an OS certificate. One might imagine certain attacks, such as saving a certificate from a previous reboot, or impersonating a real content provider to get one of the certificates. However, as noted above, the content provider generates and sends a different challenge nonce each time, thereby preventing such "replay attacks". Another possible attack is for the subscriber unit to return a proper certificate challenge but then be quickly rebooted into a different OS so that it may illicitly use the digital content. This attack is also futile because the OS maintains the SSL connection session key in secrecy and the new OS would not know the current session key being used by the SSL connection.

At block 162, the subscriber unit 24 returns the newly-minted OS certificate to the content provider 22. The subscriber unit 24 also returns the CPU manufacturer's certificate 66. At block 164, the content provider 22 receives and validates the OS certificate and manufacturer's certificate using a series of tests, enumerated as blocks 166 and 170-180. Failure of any one of the tests results in the request for content being rejected by the content provider.

The first test is whether the content provider recognizes the SIR value contained in the OS certificate and trusts the associated operating system (block 166). The content provider can also evaluate the boot log in the reply portion of the OS certificate to decide whether to trust other software components running on the subscriber unit. If the content provider chooses not to trust the OS or other components, the request is rejected (block 168).

Otherwise, assuming the OS and other modules are trusted (i.e., the "yes" branch from block 166), the content provider 22 next determines whether the challenge nonce is the same as it generated and supplied to the subscriber unit (block 170). If the nonce returned in the reply fails to match the nonce generated by the content provider, the request is rejected (block 168). However, if the two match, the content provider evaluates whether the OS certificate is properly signed with the CPU's private key $K_{CPU}^{-1}$ (block 172). The content provider makes this evaluation using the enclosed public key $K_{CPU}$.

With respect to the CPU manufacturer's certificate, the content provider determines whether the certificate names the same public key $K_{CPU}$ used in the OS certificate (block 174). If so, the content provider continues to the next test; otherwise, the request is rejected (block 168).

The content provider next examines at block 176 whether the manufacturer certificate is signed by the manufacturer's private key $K_{MFR}^{-1}$ by using the manufacturer's public key $K_{MFR}$. If the signature is proper, the content provider decides whether it trusts this manufacturer (block 178).

If all tests prove true and the content provider trusts the processor, operating system, and the manufacturers of both the processor and the operating system, the content provider can choose to download the content to the subscriber unit, along with a list of terms under which the content may be used (block 180). This list may be in the form of a license or an Access Control List (ACL), specifying by which processor, by which OS, by which application(s), and under which additional terms the content may be used. The subscriber unit 24 stores the content in the secure space 84 of memory 42 (block 182).

Secure Storage

The CPU provides for secure (Authenticated OS-specific) storage with the addition of one further opcode. The opcode is "GenerateKey(Seed)". The opcode takes a seed and generates a unique storage key SK. The seed comprises a second CPU secret key $K_2$ (distinct from the CPU public key $K_{CPU}$), the SIR or the first two entries in the boot log 70 of FIG. 5 (i.e., SIR and the following four bytes expressing a version number "2.01"), and a user-supplied seed. The seed is input to a cryptographic "pseudo-random" number generator, which is implemented as part of the cryptography accelerator 62 (or in the processor if no accelerator is present). The opcode GenerateKey(Seed) is a protected-mode (kernel accessible) instruction.

One possible implementation of the opcode instruction is as follows:

$$SK=SHA(K_2, SIR, seed) \qquad (1)$$

where SHA is a specific secure digest function called the "secure hash algorithm". The resulting storage key SK can be used to encrypt the content received from the content provider. The encrypted content is then stored in the store 84.

A second implementation is to include all or part of the boot log, as follows:

$$SK = SHA(K_2, SIR, \text{seed}, \text{Boot Log Entries}) \quad (2)$$

In this implementation, access to storage can be made dependent on all or part of the details of the remainder of the operating system running (service packs, device drivers, etc.).

Note that the same storage key can be generated from the same user seed whenever the same authenticated OS is running on the same CPU. If a different authenticated OS is booted, a different storage key is returned and the original storage key cannot be obtained. Similarly, since key generation is based on a unique key in each processor, the encrypted data cannot be moved to another machine and decrypted. Since the CPU-internal key $K_2$ is kept secret, there is no way that a non-Authenticated OS or a different authenticated OS can ever recover this number if the original authenticated OS does not reveal it.

Figure 7:
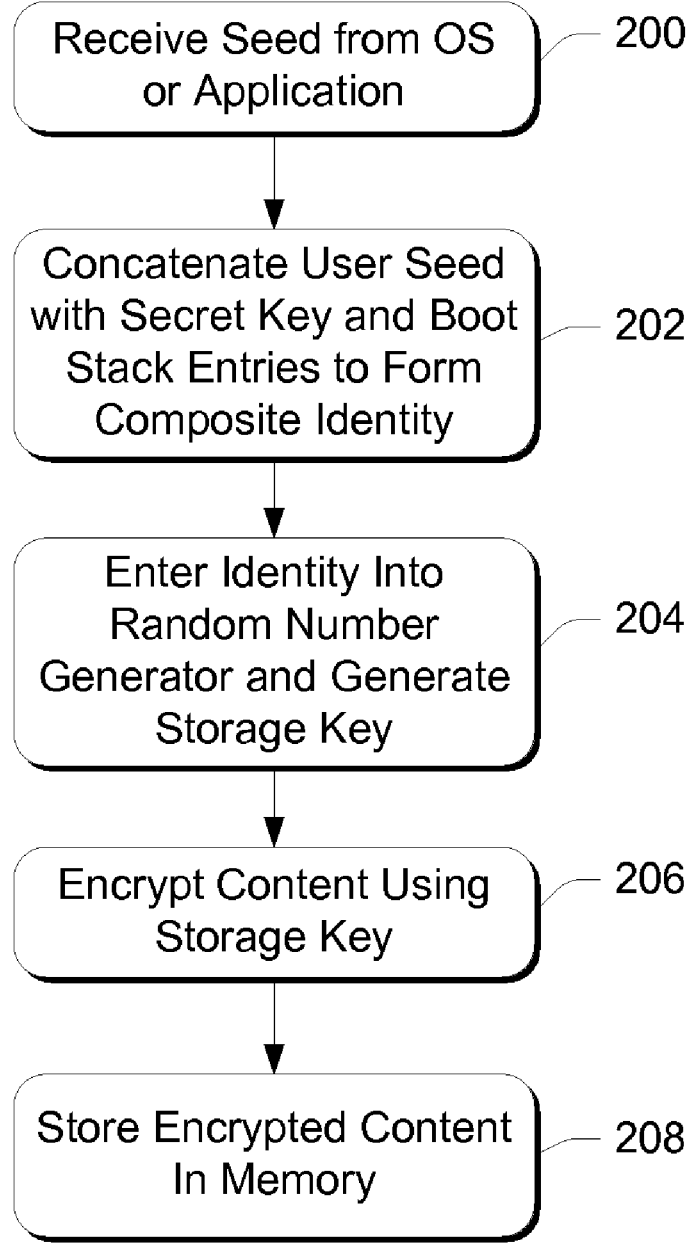
FIG. 7 is a flow diagram showing a method for securely storing digital content.

FIG. 7 shows a method for securely storing digital content supplied by the content provider within the secure store 84 on the subscriber unit 24. The method is performed by software/hardware components at the subscriber unit.

At block 200, the CPU receives an OS-supplied or application-supplied number, character string, or alphanumeric value for use as a seed. The CPU concatenates the user seed, the CPU secret key $K_2$, and the SIR or boot log entries to form a composite identifier (block 202). This identifier is input to a secure hash algorithm, which produces a storage key SK (block 204). As content arrives from the content provider, the application or operating system encrypts the content using the storage key SK (block 206). The encrypted content is then stored in memory 42 to form the secure store 84 (block 208).

The storage key SK can be regenerated as illustrated in blocks 200-204 each time the encrypted content is read. However, this mechanism does not allow the operating system to be upgraded without the SIR changing and hence the storage keys being lost. To accomplish upgrades that change the SIR, a different scheme for storing secrets (escrowed encryption keys, for instance) is used.

As an alternative to the GenerateKey operation, two new operations referred to as "Seal" and "Unseal" may be introduced, which provide the ability to seal secrets only for subsequent use on the same machine.

The "Seal" instruction takes as inputs an arbitrary block of data, the current OS identity (the SIR), and a target OS identity (a specified SIR value that must be current at the point of future decryption). The processor encrypts this data structure using a symmetric key, $K_S$.

The data block can now only be decrypted via an "Unseal" operation on the same processor, using the same symmetric key. This symmetric key is only used by the "Seal" and "Unseal" operations, and will only decrypt the secret if the target OS identity is equal to the current value of the SIR. If this check succeeds, the processor decrypts and returns the secret, otherwise it returns an error.

In this way, a processor can store encrypted information that can be decrypted only by the same processor running a specified operating system.

As a special case, the operating system can choose to seal information for a different operating system whose identity it knows and trusts. An example of this occurs when the operating system is about to be upgraded and has a signed certificate from the operating system vendor confirming the identity of the new operating system. In this case the operating system will seal its secrets for the new operating system that is about to run.

Alternatively, another approach is to employ encryption with the processor's public key and decryption using the "Reveal" operation, as described earlier. Instead of using $K_S$ for encryption and decryption, the processor's public key pair is used. This allows the "Seal" operation to be performed in software, even on another processor.

ATTEST Operation

The action of signing a statement of the current value of the SIR can be generalized into a technique for the operating system to make a signed attestation of the current value of any arbitrary region of memory and/or a register. In one implementation, the ATTEST operation is performed as follows:

ATTEST(Register Name, Region of Memory)

This operation produces a signed result:

[$K_{CPU}$, "ATTEST", Register Name, Register Value, Memory Contents] (signed with $K_{CPU}^{-1}$)

The ATTEST operation can be used to sign the current value of the SIR or any other register (including a log register LOGR, described below). The processor also signs the data contained in an arbitrary region of memory. This can be used to include the challenge value or some other signed statement desired by the operating system or application. The ATTEST operation can be used to provide an implementation of a more general form of OS certificates, as discussed earlier.

Boot Log Implementation

The boot log is an append-only record of all or selected components loaded by the operating system. This can be managed entirely in hardware, but can be simplified by means of a LOG operation.

The LOG operation constructs a secure one way digest of a supplied parameter, an internal LOGR register 69, and stores the result back in the LOGR register. At power up, or at processor reset, the LOGR register is set to zero. The LOGR register can be read, but not written apart from execution of the LOG operation. The processor can also sign a statement attesting to the current value of the LOGR register and a supplied challenge. Symbolically:

$$LOGR' = SHA^{-1}(LOG R, DATA) \quad (3)$$

where LOGR is the current value of the register, DATA is supplied to the LOGR' and is the contents of the LOGR register after the LOG operation is performed, and $SHA^{-1}$ is an exemplary one way hash function (the Secure Hash Algorithm).

The operating system can use the LOG operation to record the digest of each component as it is loaded. When online to a content provider, the ATTEST operation can be used to provide an un-tamperable attestation of all components loaded into the operating system.

In order for the content provider to be able to interpret the LOGR value, the operating system also conveys the digests of all components that made up the boot log. A content provider can then:

1. Check that all of the components revealed are known and trusted.
2. Check that the composite value obtained when the digests are combined according to equation (3) match that quoted by the microprocessor.
3. Check that the signature on the quoted statement is valid for the microprocessor public key.

4. Check the processor certificate is valid and matches the key used in the quoted statement.

If these conditions are met, the content provider can trust the client with the premium content. If they are not met, then the content provider can return a statement of the components that are not trusted so that the user or operating system can upgrade the untrusted component.

Exemplary Chipset Implementation

The fundamental requirements of atomicity and privileged access to keys for the microcode that implements authenticated boot can be met in a variety of alternative implementations. In one implementation, components in the chipset may examine the bus to infer operation and permit or deny access to keys depending on the code executing. Components on the chipset can also examine the bus for unauthorized agents writing to protected code, or reading unauthorized secrets.

An agent on the bus can also check for unauthorized interrupts during the execution of the authenticated operations or execution of the boot block.

Similarly, there is no fundamental requirement for the microcode that implements the authenticated boot operations to by physically resident on the microprocessor chip. It could also be stored in ROM, EPROM, or protected flash memory in a physically separate device on the bus.

BIOS Implementation

The authenticated boot technique can be implemented by existing CPU operating modes using code in the computer's BIOS code. The System Management Mode (SMM), supported by Intel microprocessors, provides for a region of memory that is inaccessible to normal operating system operation, but can provide subroutines that operating systems or applications can use. Such SMM protected memory could be used for the storage of keys and the code that manages those keys.

Improved Security

Hash algorithms and signature schemes can be broken. One example of a security break is that an attacker finds a second boot block that has the same identity (same signature, or same digest). If such a boot block is found, then a different operating system can be booted, and all content security is lost.

Greater security can be obtained by combining security schemes. For instance, the OS-identity can be formed as the concatenation of two or more digests calculated using different hash algorithms, or the same algorithm applied to boot block data in a different order (for instance, backwards).

In the case of signature based identity, the boot block can be signed several times using different signature algorithms and keys. Again the software identity becomes the concatenation of the relevant public keys. This technique also provides protection against private key compromise. If one of the signing keys is compromised, not all security is lost.

Recertification

Microprocessor key compromise is inevitable and is traditionally handled by revocation lists (list of untrusted hosts). However, if the certificates that vouch for the microprocessor keys never expire, then revocation lists will grow uncomfortably large. This problem can be ameliorated by finite lifetime processor certificates. Content providers will require valid certificates (not expired), and the chip vendor (or other trusted party) will be required to re-issue certificates for chips still considered in good standing (not revoked). Note that the certificates are not used when offline, so machines do not stop working when the certificates expire. However, in online transactions, on occasional (probably automated) extra step would be to get a new certificate.

CONCLUSION

The authenticated boot technique has many advantages. It enables use of open platforms for building trusted systems, where the open platforms can run arbitrary operating systems and arbitrary software. Moreover, it can authenticate the combination of the hardware and the software in the subscriber unit. One resulting advantage of this invention is that the content provider and not the owner or manufacturer of the PC or of the OS is responsible for determining trust. Another advantage is that when data is stored persistently, the storage key need not be stored with it, and the client need not go back online to obtain a new key. The data can be decrypted at any time by the same OS on the same processor, but cannot be decrypted by an unauthorized OS or on a different processor. Another advantage is that any number of independent Authenticated or non-Authenticated operating systems can be booted serially on the same system. The CPU automatically provides each with independent services for cryptographic key generation and data storage. Moreover, a secure OS can be easily modified for both authentication and security by changing the boot code and checking signatures before loading.

Although the invention has been described in language specific to structural features and/or methodological actions, it is to be understood that the invention defined in the appended claims is not necessarily limited to the specific features or actions described. Rather, the specific features and actions are disclosed as preferred forms of implementing the claimed invention.

What is claimed is:

1. A method implemented in a subscriber unit for establishing a chain of trust between the subscriber unit and a content provider, the subscriber unit having a central processing unit (CPU) and an operating system (OS), the CPU having a pair of private and public keys, a manufacturer certificate supplied by a manufacturer of the CPU, and a software identity register that holds an identity of the operating system, the method comprising:
   submitting a request to the content provider, the request specifying a particular content;
   receiving, from the content provider, a challenge nonce generated at the content provider;
   forming an OS certificate containing the identity from the software identity register, information describing the operating system, the challenge nonce, and the CPU public key and signing the OS certificate using the CPU private key, wherein the forming comprises forming the OS certificate with one or more items from a boot log containing identities of software components that are executing on the CPU;
   passing the OS certificate and the CPU manufacturer certificate to the content provider for the content provider to evaluate the OS certificate and the CPU manufacturer to determine whether to reject or fulfill the request.

2. The method as recited in claim 1, wherein the content provider evaluates the OS certificate by determining whether to trust the identity in the OS certificate.

3. The method as recited in claim 1, wherein the content provider evaluates the OS certificate by determining whether the challenge nonce returned in the OS certificate is the challenge nonce generated by the content provider.

4. The method as recited in claim 1, wherein the content provider evaluates the OS certificate by verifying the signature on the OS certificate using the CPU public key contained in the OS certificate.

5. The method as recited in claim 1, wherein the content provider evaluates the OS certificate by determining whether the OS certificate and the manufacturer certificate contain an identical CPU public key.

6. The method as recited in claim 1, wherein the content provider evaluates the OS certificate by verifying a manufacturer signature on the manufacturer certificate.

7. The method as recited in claim 1, wherein the content provider evaluates the OS certificate by determining whether to trust the manufacturer of the CPU.

8. The method as recited in claim 1, further comprising downloading the content specified in the request in an event that the content provider elects to fulfill the request.

9. The method as recited in claim 8, the content provider having encrypted the content using a storage key derived in part from the identity of the operating system.

10. A method implemented in a content provider for establishing a chain of trust between the content provider and a subscriber unit, in which the subscriber unit has a central processing unit (CPU) and an operating system (OS) and the CPU further includes a pair of private and public keys, a manufacturer certificate supplied by a manufacturer of the CPU, and a software identity register that holds an identity of the operating system, the method comprising:
receiving a request from the subscriber unit, the request specifying a particular content;
generating a challenge nonce;
returning the challenge nonce to the subscriber unit;
receiving, from the subscriber unit, the CPU manufacturer certificate and an OS certificate containing the identity from the software identity register, information describing the operating system, the challenge nonce, and the CPU public key, the OS certificate having been signed using the CPU private key, wherein the identity from the software identity register comprises one or more items from a boot log containing identities of software components executing on the CPU; and
evaluating the OS certificate and the CPU manufacturer certificate at the content provider to determine whether to reject or fulfill the request.

11. A method implemented by a third party for associating a level of trust with a user computer, the user computer having a central processing unit (CPU) and an operating system (OS), the CPU having a pair of private and public keys, a manufacturer certificate supplied by a manufacturer of the CPU, and a software identity register that holds an identity of an operating system executing on the CPU, the method comprising:
establishing a secure connection between the user computer and the third party;
generating a challenge nonce;
transmitting the challenge nonce to the user computer over the secure connection;
receiving, from the user computer, an OS certificate and the challenge nonce, wherein the OS certificate comprises one or more items from a boot log containing identities of software components executing on the CPU, and wherein the OS certificate and the challenge nonce are signed by the user computer using the CPU private key;
associating the level of trust for the user computer using the signed OS certificate.

12. The method as recited in claim 11, wherein the identities of the software components executing on the CPU are held in the software identity register.

13. The method as recited in claim 11, wherein the level of trust is based on the operating system identified by the software identity register.

14. The method as recited in claim 11, wherein the OS certificate comprises a boot log.

15. The method as recited in claim 11, wherein the OS certificate comprises a value of a register containing a value associated with a boot log.

16. The method as recited in claim 11, wherein the level of trust is based on the identities of the software components executing on the CPU.

17. The method as recited in claim 11, wherein the software components include device drivers executing on the CPU.

18. The method as recited in claim 17, wherein the level of trust is based on the identities of the device drivers executing on the CPU.

19. The method as recited in claim 11, further comprising:
receiving, from the user computer, a request for access to specific content;
evaluating whether to permit access based on the level of trust associated with the user computer.

20. The method as recited in claim 19, wherein the access comprises:
transmitting the specific content to the user computer through the secure connection.

21. The method as recited in claim 19, wherein the access comprises:
transmitting a storage key for the specific content to the user computer through the secure connection, wherein the specific content was previously stored on the user computer.

22. The method as recited in claim 21, wherein the specific content was obtained outside the secure connection.

* * * * *